(12) United States Patent
Voor et al.

(10) Patent No.: US 7,449,862 B1
(45) Date of Patent: Nov. 11, 2008

(54) METHOD AND APPARATUS FOR CHARGING A BATTERY USING A THRESHOLD TO CEASE CHARGING

(75) Inventors: Thomas E. Voor, Parkland, FL (US); Stephen J. Oglesby, Plantation, FL (US); Joseph Patino, Pembroke Pines, FL (US)

(73) Assignee: Motorola, Inc., Schaumburg, IL (US)

( * ) Notice: Subject to any disclaimer, the term of this patent is extended or adjusted under 35 U.S.C. 154(b) by 62 days.

(21) Appl. No.: 11/536,859

(22) Filed: Sep. 29, 2006

(51) Int. Cl.
*H01M 10/44* (2006.01)
*H01M 10/46* (2006.01)

(52) U.S. Cl. ......................... 320/107; 320/160

(58) Field of Classification Search ................ 320/107, 320/110, 128, 134, 136, 160, 162
See application file for complete search history.

(56) References Cited

U.S. PATENT DOCUMENTS

| | | | | |
|---|---|---|---|---|
| 5,864,220 A | * | 1/1999 | Reipur et al. | 320/134 |
| 6,075,339 A | * | 6/2000 | Reipur et al. | 320/110 |
| 2007/0132427 A1 | * | 6/2007 | Veselic | 320/111 |

* cited by examiner

*Primary Examiner*—Edward Tso
(74) *Attorney, Agent, or Firm*—Randall S. Vaas

(57) ABSTRACT

A device (102) contains a battery (116) which is recharged under control of a charge controller (112). An external power supply (104) provides charging current and voltage (106). A linear regulator (110) regulates the raw voltage provided by the external power supply. The device (102) also contains a heat-generating sub-system (118). To prevent excess heat generation while charging the battery, the battery charging regime is altered from a conventional regime when the heat-generating sub-system is active. Once the battery voltage reaches a charge limit (208), charge current is ceased (210) until the battery voltage falls to a lower limit (212), at which time the charging current is recommenced.

16 Claims, 4 Drawing Sheets

000
METHOD AND APPARATUS FOR CHARGING A BATTERY USING A THRESHOLD TO CEASE CHARGING

TECHNICAL FIELD

This invention relates in general to charging rechargeable batteries, and more particularly to charging batteries attached to small, portable devices where heat generation is a concern.

BACKGROUND OF THE INVENTION

Portable, handheld electronic devices are in widespread use and are commonly powered by rechargeable or secondary batteries. Rechargeable batteries or battery packs substantially reduce the expense of operating such devices compared to primary or non-rechargeable batteries. At the same time a common goal in the design of electronic devices is to reduce their size. Many such devices now include the means to allow charging of the battery while it is attached to the device. Typically an external DC power supply is coupled to the device, and circuitry inside the device is used to control charging of the battery.

When a rechargeable battery is charged rapidly, heat is generated, especially as the battery reaches a full charge. The heat generated by the battery can add to the heat generated by the circuitry of the device and affect operation and performance of the device by heating components and circuitry inside the device. Therefore there is a need for a means by which a battery associated with an electronic device that has heat sensitive components can be recharged without interfering with the operation and performance of the device.

DETAILED DESCRIPTION

Figure 1:
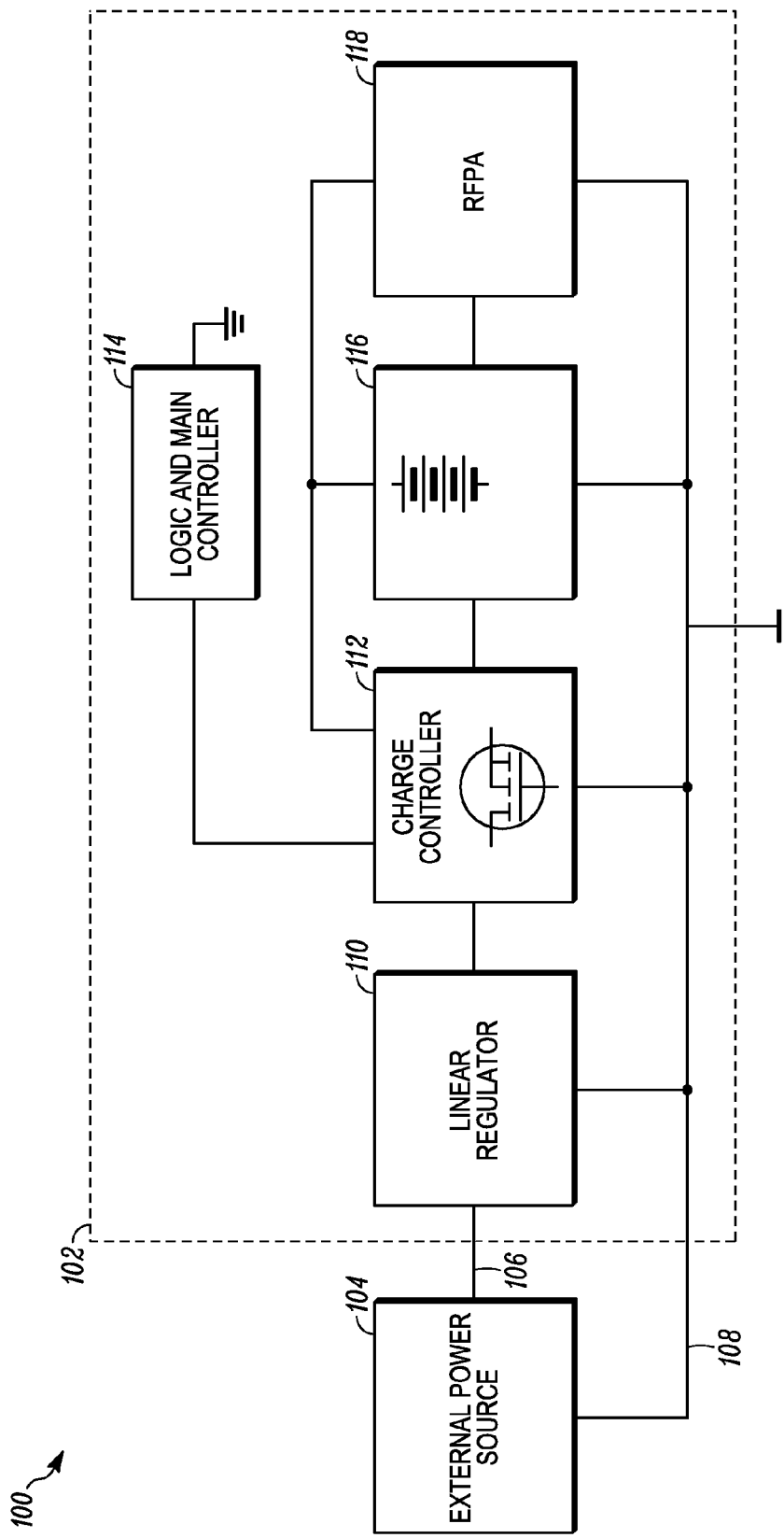
FIG. 1 shows a schematic block diagram of a charger in accordance with an embodiment of the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of heat generation in an electronic device while charging a battery coupled to the device by adjusting the charging method when the device is engaged in another activity that results in heat generation within the device. Rather than continuing a conventional constant voltage charge routine when the device is engaged in another heat-generating activity the device ceased charging once the voltage of the battery reaches an upper charge voltage limit and resumes charging using a constant current mode only when the battery voltage falls to predetermined lower limit. According to one embodiment of the invention, when a mobile communication device is engaged in a call while charging a lithium ion battery that is coupled to the mobile communication device, upon the battery voltage reaching an upper limit of, for example, 4.2 volts, the mobile communication device ceases charging current until the battery voltage drops to a lower limit, at which time constant current charging resumes until the charge voltage limit is again reached. The lower limit may be set at, for example, 3.8 volts. If the call ends, the mobile communication device commences charging the battery using a constant current charge mode, followed by a constant voltage charge mode once the charge voltage limit is reached.

Referring now to FIG. 1, there is shown a schematic diagram of a device and charger system 100 in accordance with an embodiment of the invention. The device 102 may be, for example, a mobile communication device. The device has its own internal charge controller 112 and a battery 116 that may be removeably coupled to the device, and which is charged by the device when the device is coupled to an external power source 104. The external power source may be, for example, a transformer-rectifier for stepping down AC voltage and providing a raw DC voltage 106 that may be further regulated. The external power source also provides a reference or ground potential 108. Alternatively, the external power source may be a 12 volt automobile source such as a cigarette lighter adapter. To ensure a clean DC level within the device 102, a regulator such as linear regulator 110 further regulates the raw DC voltage down to a voltage slightly higher than the highest expected battery voltage, such as, for example, 4.5 volts. The output of the regulator 110 is higher than a charge voltage limit to which the battery 116 will be charged, but it is intended to provide sufficient overhead voltage to allow control and operation of the device. The charge controller 112 includes circuitry for regulating charging current and voltage provided to the battery 116 from the output of the linear regulator 110. Typically the charge controller uses a transistor device such as a MOSFET as a control transistor to control the output voltage and current provided to the battery. In the present embodiment, the current is limited by the external power supply, and so when operating in the constant current mode, the control transistor of the charge controller remains in a saturated state to offer as little electrical resistance as possible, letting the available current from the external power supply flow into the device to charge the battery. The charge controller 112 may also provide an output to power subsystems of the device, such as a logic or digital system and controller 114. In one embodiment of the invention it is contemplated that between the output of the linear regular 110 and the logic system 114, the charge controller simply provides a diode function so that power from the battery can flow into the logic system, but not back into the linear regulator to prevent discharge when the external power supply is not present or not plugged into an AC source. The charge controller charges the battery 116 according to a charge regime in accordance with the invention. According to the present invention, when the battery is first charged, and while the battery voltage is below a charge limit threshold, the charge controller applies a constant current to the battery. The maximum charge current is dictated by the external power supply which provides a limited current level. As the battery voltage increases, the voltage differential across the linear regulator decreases, which decreases the power dissipation of the linear regulator. However, because the external power supply is current limited, the control transistors in the charge controller are saturated, minimizing power dissipation. However, once constant voltage charging commences, the control transistor of the charge controller operates in the linear region, and dissipates more power. In fact, at the transition point between constant voltage to constant current charging, the power dissipation in the charge controller is at a peak since the current is close to the current level of the constant current charging, and the voltage across the charge controller remains relatively fixed as the difference of the output of the linear regulator and the battery voltage.

The device further comprises a heat generating component or subsystem, such as a radio frequency power amplifier 118 (RFPA). The RFPA 118 is used to transmit radio signals. In the case of a mobile communication device, the RFPA operates when, for example, the mobile communication device is engaged in a call. To avoid excess heat generation in the mobile communication device, the mobile communication device avoids constant voltage charging while the heat generating subsystem is engaged. Instead, the charge controller switches to a modified constant current pulse charge where the battery is charged to the charge limit voltage, ceases all charge current, and resumes constant current charging when the battery voltage falls to preselected threshold. If the heat generating subsystem is disengaged, such as when a call in a mobile communication device is terminated, then the charge controller may revert to the conventional constant current to constant voltage charging regime.

Figure 2:
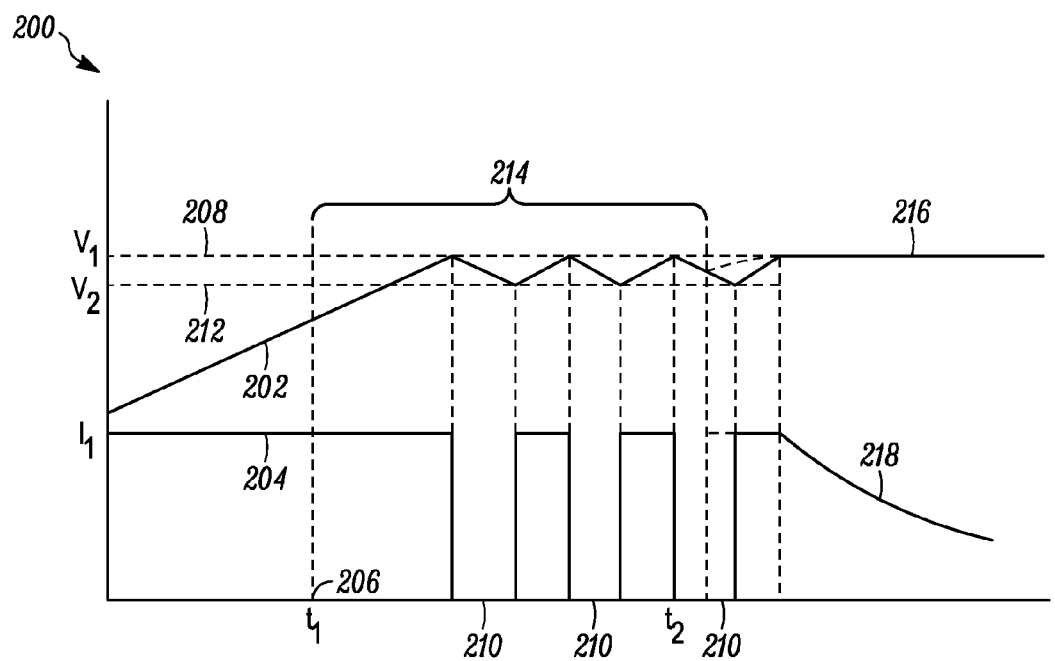
FIG. 2 shows a charging time diagram of a battery being charged according to an embodiment of the present invention.

Referring now to FIG. 2, there is shown a charging time diagram 200 of a battery being charged according to an embodiment of the present invention. The chart shows battery voltage 202 and charging current 204. The battery being charged is disposed in a device having a heat-generating subsystem which is periodically operated, such as a RFPA in a mobile communication device. Initially the battery is charged at a constant current level, causing the battery voltage to rise correspondingly. During the initial charging, the heat-generating subsystem becomes engaged, such as when a mobile communication device engages in a call and begins transmitting, at time 206. As the voltage increases, it eventually rises to a charge limit threshold 208. When the charge limit threshold is reached, because the heat-generating subsystem is active, the charge current ceases for a time 210 until the battery voltage falls to a preselected threshold level 212, at which time constant current charging at a maximum charge current provided by the external power supply commences again. The process of charging at the maximum current and then substantially ceasing the charge current repeats as long as the heat-generating subsystem is engaged, such as during time period 214. Once the heat-generating subsystem is no longer engaged, as at the end of time period 214, then the battery may resume being charge, either immediately or once the battery voltage falls to the preselected threshold 212, by a constant current to constant voltage regime. When the heat-generating subsystem is not active, and the charge limit threshold 208 is reached, then the charge current is reduced 218 to maintain the battery voltage constant 216. According to the invention, when it is said that the heat generating subsystem is engaged, it meant that the device is engaged in an activity which uses the heat-generating subsystem, although the heat-generating subsystem may not actually be powered during the entire engagement of the activity. For example, an RFPA of a mobile communication device operating according to a time division multiple access communication protocol may only used 1 out of 8 time slots of a repeating time frame. However, while the mobile communication device is engaged in the communication activity, it is said that the RFPA is engaged in the context of heat generation, although it may not actually be transmitting constantly.

Figure 3:
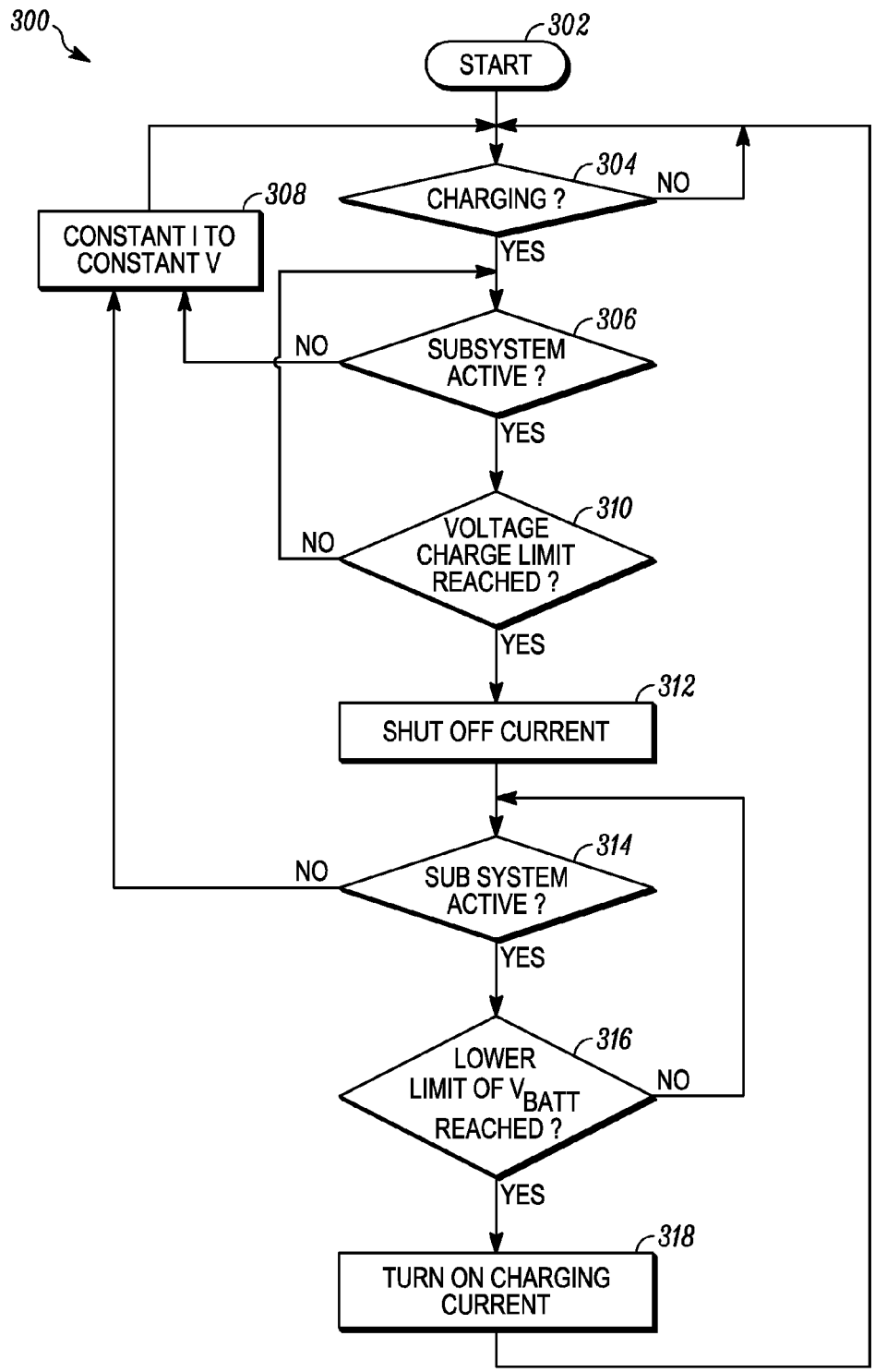
FIG. 3 shows a flow chart diagram of a method of charging a battery, in accordance with an embodiment of the invention.

Referring now to FIG. 3, there is shown a flow chart diagram 300 of a method of charging a battery, in accordance with an embodiment of the invention. At the start 302 the battery is coupled to the device which is to be powered by the device and an external power supply is couple to the device. The device is substantially equivalent to that shown in FIG. 2, and includes a charge controller and some heat-generating subsystem that is operated periodically. The power supply couple to the device preferably provides a maximum output voltage and provides a maximum current. Once the device detects the presence of the external power supply, and assuming the battery is not presently fully charged, the charging commences (304). If the battery is fully charged the device may wait for the charge to diminish to preselected level. If charging is commenced, the full current available from the external power supply is applied to the battery and other circuitry of the device. While charging commences, the method tracks the operation of the heat-generating subsystem (306). While the subsystem is not active, the method applies a conventional constant current to constant voltage charge regime (308). If the subsystem becomes active, the method determines whether the battery voltage has reached the charge limit threshold (310). While the battery voltage is below the charge limit threshold and the subsystem is active, the method simply continues constant current charging using the maximum current available from the external power supply. Once the battery voltage reaches the charge limit threshold, the method shuts off the charge current (312). The current may be shut off simply by, for example, causing the charge control transistor in the charge control circuit to change from a low impedance or saturated state to a high impedance state. Once the charge current is shut off, the method checks on the state of the subsystem (314). If the subsystem becomes inactive, then the method resumes conventional constant current to constant voltage charging (308). But, according to the invention, while the subsystem remains active or engaged, and while the battery voltage remains above a preselected threshold (316), the charge current remains shut off. However, with the subsystem active, once the battery voltage falls to the preselected threshold, the method turns the charge current back on (318), and the method repeats. Those skilled in the art will realize that the elements of the method can be rearranged from that shown in FIG. 3 without substantially deviating from the intended operation.

Figure 4:
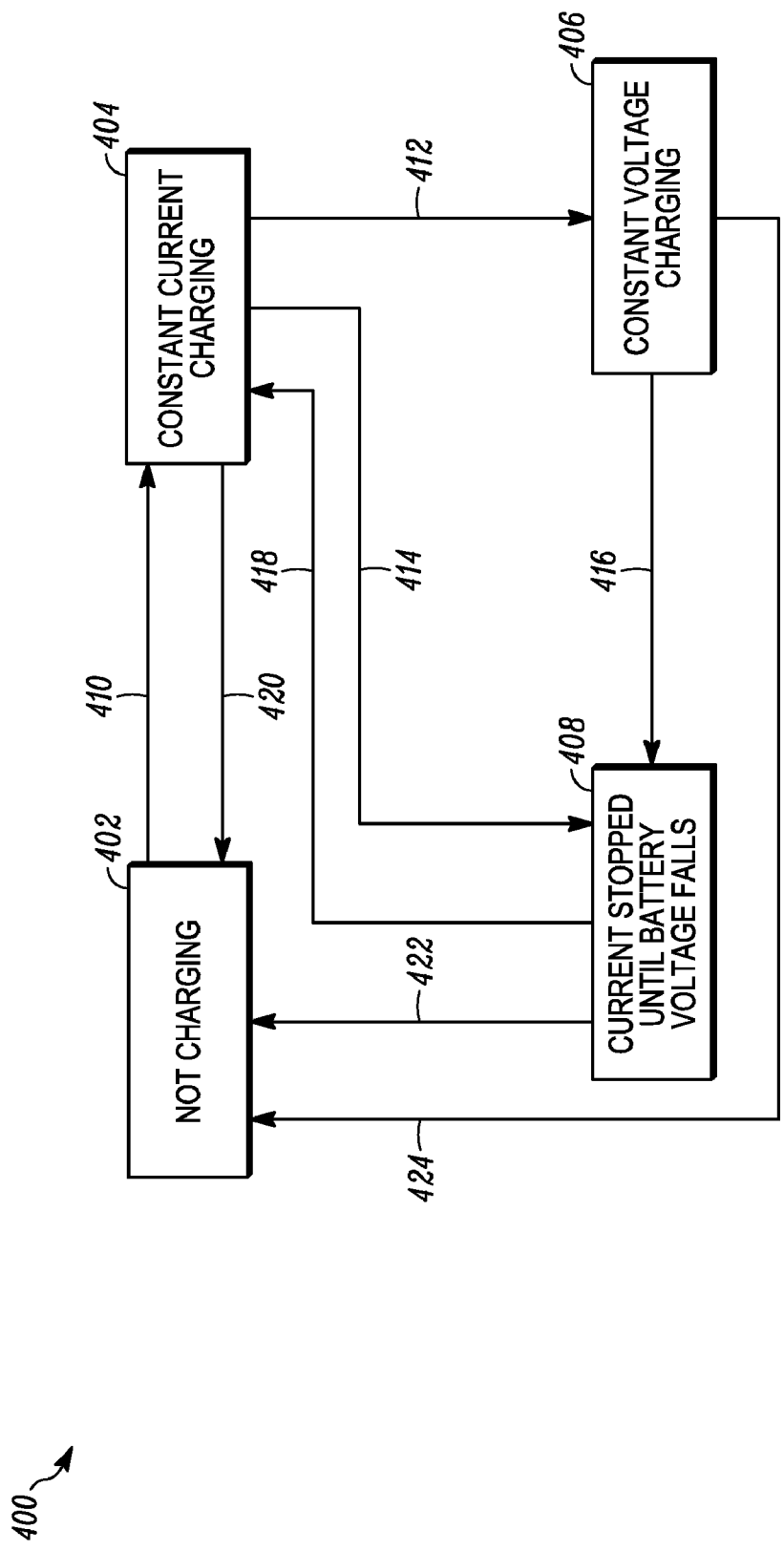
FIG. 4 shows a state diagram of a method of charging a battery, in accordance with an embodiment of the invention.

Referring now to FIG. 4, there is shown a state diagram 400 of a method of charging a battery, in accordance with an embodiment of the invention. There are shown four states; "not charging" 402, "constant current charging" 404, "constant voltage charging" 406, and "charging ceased" 408. The "not charging" state refers to the time when the external power supply is not present to power. Upon connection to the external power supply, the charging commences, as indicated by event line 410, by applying the current available from the external power supply to the battery. The charge current is set by the external power supply, and the charge controller of the device simply allows the charge current to pass through the battery and device circuitry. The method remains in the constant current charging state until either the external power supply is disconnected, as indicated by event line 420, or the battery voltage reaches a charge limit threshold, as indicated alternatively by event lines 412 and 414. Event line 412 is followed if the device is not presently activating the heat-generating subsystem. In that case, the method state moves to constant voltage charging 406. In the constant voltage state, the current is continuously reduced to maintain the voltage at a constant level. However, if upon reaching the charge limit threshold in the constant current state 404 while the heat-generating subsystem is active, or if the heat-generating subsystem becomes active while in the constant voltage state 406, event lines 414 and 416 respectively indicate the method transitions to charging ceased state 408. The charging ceased state temporarily ceases the charge current to the battery while the heat-generating subsystem is active and while the battery voltage remains above a preselected threshold that is lower than the charge limit threshold. When the battery voltage falls to the preselected threshold, the method exits the charging ceased state and goes back to the constant current state 404 and indicated by event line 418. Since the battery voltage is falling due to power consumption of the heat-generating subsystem, the method does not transition from the charging ceased state 408 to the constant voltage state 406 as some constant current charging will be necessary to reach the charge limit threshold again. If during the charging ceased and constant voltage charging states the external power supply becomes disconnected, the method transitions to the not charging state 402, as indicated by event lines 422 and 424, respectively.

Thus, the invention provides a method of charging a battery attached to a device, such as, for example, a mobile communication device. The method specifically addresses charging after the battery has been charged to a charge voltage limit. Once the charge voltage limit of the battery has been reached, and while the mobile communication device is not engaged in a communication activity, the invention calls for continuing charging of the battery using a constant voltage charge regime. If the mobile communication device engages in a call or equivalent communication activity, then while the mobile communication device is engaged in a communication activity, the method calls for ceasing charging until the battery voltage falls to a preselected threshold, and subsequently upon the battery voltage falling to the preselected threshold, charging the battery with a constant current charge regime until the battery voltage reaches the charge voltage limit. The process of ceasing charging followed by constant current charging the battery voltage back to the charge voltage limit is repeated while the communication activity continues.

The invention also provides a battery charging system for a device such as, for example, a mobile communication device. The device includes an attached rechargeable battery and a current-limited power supply coupled to the device for supplying a charging current to the device. The invention includes a charge control transistor coupled in series between the current-limited power supply and the rechargeable battery. The charge control transistor controls the flow of current from the current-limited power supply to the battery. The device also includes a charge controller for monitoring the battery voltage of the rechargeable battery and controlling operation of the charge control transistor. The charge controller operates the charge control transistor in an on state while the rechargeable battery is first charged to a charge voltage limit, thereby allowing most of the available current from the current-limited power supply to pass through the battery. While the device is not engaged in, for example, a communication activity, the charge control transistor is operated in a linear mode to maintain a substantially constant voltage at the rechargeable battery. While the mobile communication device is engaged in, for example, a communication activity, the charge control transistor is maintained in an off state until the battery voltage falls to a preselected threshold, at which time the charge control transistor is placed in an on state until the charge voltage limit is reached. The process of operating the charge control transistor as a switch rather than as a linear regular, and switching it on to allow constant current charging, or ceasing the charging, is repeated for as long as the device is engaged in the communication activity.

The invention further provides a method for charging a battery of a device which has a heat-generating subsystem disposed in the device along with the battery. The method commences upon coupling an external power supply to the device. The external power supply provides a charge current which has a maximum current level. The maximum current level is a substantially constant DC level. The charging commences by charging the battery at a substantially constant charging current until a battery voltage of the battery reaches a charge limit threshold. For example, in the case of lithium ion batteries, the charge limit threshold would be approximately 4.2 volts. Subsequent to the battery voltage reaching the charge limit threshold a first time, the method calls for one of two modes of operation, depending on the status of the heat-generating subsystem. While the heat-generating subsystem is not active, the battery is charged using a constant voltage charge regime. While the heat-generating subsystem is active subsequent to the battery voltage first reaching the charge limit threshold the charging is ceased until the battery voltage falls to a preselected threshold. Upon the battery voltage falling to the preselected threshold, the battery is charge with a constant current charge regime until the battery voltage reaches the charge limit threshold. Ceasing charging and charging the battery with a constant current charge regime until the battery voltage reaches the charge voltage limit are repeated while the heat-generating subsystem is active.

The invention further provides a method for charging the battery of a device having a heat-generating subsystem where the battery is disposed in the device, and the charging is controlled by a charge controller in the device. The method includes charging the battery with a substantially constant current until a battery voltage of the battery first reaches a charge limit threshold. While charging the battery, the device commences activating the heat-generating subsystem. While activating the heat-generating subsystem, the method alternates between ceasing charging until the battery voltage falls to a preselected limit, and charging the battery with a substantially constant current until the battery voltage again reaches the charge limit threshold.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of charging a battery attached to a mobile communication device after the battery has been charged to a charge voltage limit, the method then comprising:
   while the mobile communication device is not engaged in a communication activity, continuing charging of the battery using a constant voltage charge regime;
   while the mobile communication device is engaged in a communication activity, the method comprising:
      ceasing charging until the battery voltage falls to a preselected threshold; and
      upon the battery voltage falling to the preselected threshold, charging the battery with a constant current charge regime until the battery voltage reaches the charge voltage limit.

2. A method of charging a battery as defined in claim 1, wherein charging the battery is controlled by a charge controller in the mobile communication device.

3. A method of charging a battery as defined by claim 1, wherein the charge voltage limit is substantially 4.2 volts.

4. A method of charging a battery as defined by claim 1, wherein the mobile communication device is supplied by a current-limited power supply for charging the battery, while the mobile communication device is engaged in the communication activity, charging and ceasing charging is performed by operating a charge control transistor in an on state and an off state, respectively.

5. A method of charging a battery as defined by claim 4, further comprising providing an intermediate voltage regulator between the current-limited power supply and the charge control transistor.

6. A battery charging system for a mobile communication device, the mobile communication device including an attached rechargeable battery and a current-limited power supply coupled to the mobile communication device for supplying a charging current to the mobile communication device, the battery charging system comprising:
   a charge control transistor coupled in series between the current-limited power supply and the rechargeable battery; and
   a charge controller for monitoring a battery voltage of the rechargeable battery and controlling operation of the charge control transistor;
   wherein the charge controller operates the charge control transistor in an on state while the rechargeable battery is first charged to a charge voltage limit, and subsequently:
      while the mobile communication device is not engaged in a communication activity, operating the charge control transistor in a linear mode to maintain a substantially constant voltage at the rechargeable battery; and
      while the mobile communication device is engaged in a communication activity, operating the charge control transistor in an off state until the battery voltage falls to a preselected threshold, then operating the charge control transistor in an on state until the charge voltage limit is reached.

7. A battery charging system as defined in claim 6, further comprising an intermediate voltage regulator coupled between the current-limited power supply and the charge control transistor.

8. A battery charge system as defined in claim 7, wherein the intermediate voltage regulator is a linear regulator.

9. A battery charge system as defined in claim 7, wherein the charge control transistor comprises at least one MOSFET transistor.

10. A battery charge system as defined in claim 6, wherein the charge voltage limit is substantially 4.2 volts.

11. A method for charging a battery of a device, the device having a heat-generating subsystem, the method comprising:
   coupling an external power supply to the device, the external power supply providing a charge current having a maximum current level;
   charging the battery at a substantially constant charging current until a battery voltage of the battery reaches a charge limit threshold, the charging current provided by the external power supply;
   Subsequent to the battery voltage reaching the charge limit threshold a first time;
      while the heat-generating subsystem is not active, charging of the battery using a constant voltage charge regime;
      while the heat-generating subsystem is active, the method comprising:
         ceasing charging until the battery voltage falls to a preselected threshold; and
         upon the battery voltage falling to the preselected threshold, charging the battery with a constant current charge regime until the battery voltage reaches the charge limit threshold.

12. A method for charging a battery of a device as defined in claim 11, wherein ceasing charging and charging the battery with a constant current charge regime until the battery voltage reaches the charge voltage limit are repeated while the heat-generating subsystem is active.

13. A method for charging a battery of a device as defined in claim 11 wherein charging the battery to the charge limit threshold comprises charging the battery until the battery voltage reaches substantially 4.2 volts.

14. A method for charging a battery of a device having a heat-generating subsystem, the battery being disposed in the device, the charging being controlled by a charge controller in the device, the method comprising:
   charging the battery with a substantially constant current until a battery voltage of the battery first reaches a charge limit threshold;
   activating the heat-generating subsystem of the device; and
   while activating the heat-generating subsystem, alternating between:
      ceasing charging until the battery voltage falls to a preselected limit; and
      charging the battery with a substantially constant current until the battery voltage again reaches the charge limit threshold.

15. A method for charging a battery as defined in claim 14, wherein activating the heat-generating subsystem comprises periodically transmitting using a radio frequency power supply during a communication activity of the device.

16. A method for charging a battery as defined in claim 14, further comprising:
   deactivating the heat-generating subsystem;
   charging the battery using a substantially constant current until the battery voltage reaches the charge limit threshold; and
   charging the battery at a substantially constant voltage.

* * * * *